United States Patent Office 3,245,757
Patented Apr. 12, 1966

3,245,757
METHOD OF PREPARING ZIRCONIUM OXIDE
Irvin C. Klimaszewski, Pensacola, Fla., assignor, by mesne assignments, to Pittsburgh Plate Glass Company
No Drawing. Filed Mar. 6, 1962, Ser. No. 177,727
10 Claims. (Cl. 23—102)

This application is a continuation-in-part of our copending application Serial No. 819,839, filed June 12, 1959, now abandoned.

This invention relates to a novel method of preparing dense zirconium oxide having a bulk density of at least 40 pounds per cubic foot and frequently having a density as high as 90 to 150 pounds per cubic foot or more. The production of a material of this character is highly desirable.

In the chlorination of zirconium oxide in a fluidized or dynamic bed, the oxide is suspended in an upwardly rising stream of a chlorinating gas, such as elemental chlorine, while the temperature of the oxide is maintained high enough to cause chlorination, for example, 600 to 800° C. or above. The relatively high velocity of gases passing though a bed of this character causes at least a portion of the zirconium oxide to entrain in the gas stream and to be carried out of the chlorination reaction zone before chlorination can take place. This difficulty is minimized by use of high density zirconium oxide herein contemplated. Dense zirconium oxide is also suitable for other uses such as a weighting agent in oil well drilling muds, a pigment in paper or the like.

According to this invention, it has been found that zirconium oxide having a bulk density in excess of 40 pounds per cubic foot can be prepared by calcining a thixotropic or pasty mixture of water and basic nitrates of zirconium at a temperature sufficiently high to decompose the basic nitrates of zirconium and to drive nitrogen oxide or oxides therefrom. The nitrates of zirconium which are used may be basic zirconium nitrate (zirconyl nitrate which has the formula $ZrO(NO_3)_2$ or any other nitrate of zirconium containing more zirconium than zirconyl nitrate, such as those whose analyses correspond to the general formula $ZrO(NO_3)_x$ where $x$ is less than 2, normally not less than 0.1 to 0.2). These compounds may if desired be wet with aqueous nitric acid and/or zirconyl nitrate solution.

According to a further embodiment of the present invention, it has been found that the thixotropic or pasty form of the basic nitrates of zirconium can be produced by heating a solution of zirconyl nitrate at a temperature sufficiently high to cause the solution to concentrate and to precipitate crystals of nitrate of zirconium, and continuing this heating until the resulting slurry when filtered produces a filter cake which exhibits a thixotropic or pasty consistency. Heating the slurry of solids for a period of at least 10 to 24 hours or more is usually sufficient for this purpose.

In the typical practice of a satisfactory embodiment of the invention, a pool of the zirconyl nitrate solution is established and this pool is heated until a nitrate of zirconium precipitates, and heating is continued until the precipitated product when filtered forms a pasty or thixotropic filter cake. This usually takes 10 to 24 hours' continued heating after solids have precipitated. Thereafter, the process is conducted in a continuous manner by feeding further zirconyl nitrate solution into the evaporating pool and withdrawing slurry therefrom. The rate of feed and withdrawal generally is balanced to maintain the pool at a more or less constant level and to ensure that the average retention time of the zirconium in the pool is about 10 to 24 hours or more. The slurry or suspension which is withdrawn from the pool is then treated to separate water therefrom and to form a paste. This may be conducted by any suitable filtration operation, including centrifugation.

The pasty product thus obtained is clearly thixotropic in character. In some cases, however, this thixotropic material may be mixed with more coarsely crystalline nitrates of zirconium which alone forms a granular filter cake. The mixture of these two forms of nitrates of zirconium is pasty and has the consistency of grease or grease mixed with sand.

The resulting cake usually contains appreciable water. A portion of this water may be driven off by heating at 105° C. This amount of water, which may be termed "free water," usually ranges from 5 to 25 percent by weight. Another portion of the water is driven off upon ignition. This amount of water ranges from 5 to 20 percent by weight.

Frequently, the solutions subjected to evaporation to produce the thixotropic or pasty form of nitrates of zirconium contain an appreciable concentration of nitric acid. Thus, the free nitric acid concentration of the solution very often will range from 5 to 50 percent (preferably at least 25 percent) by weight.

Following preparation of the pasty or thixotropic nitrates of zirconium, this product is calcined at an elevated temperature to drive off nitrogen oxide and to produce zirconium oxide. The calcination can take place at any convenient temperature at which the nitrates decompose, for example, in the range of 550 to 1500° F. This calcination can be conveniently effected by introducing the paste or like product into one end of a rotating horizontal cylindrical kiln which is externally fired. As a consequence of the heating, the mixture of nitrogen oxide and water is driven off and is collected as nitric acid in a suitable condensing system. The zirconium works its way toward the exit end of the kiln where it is discharged in the form of essentially pure zirconium oxide. This zirconium oxide is found to have unusual density, usually well over 40 pounds per cubic foot and usually in the range of 90 to 150 pounds per cubic foot bulk density.

The following example illustrates the manner by which dense zirconium oxide herein contemplated may be prepared and subjected to chlorination:

*Example 1*

An aqueous solution of zirconyl nitrate prepared by dissolving zicronium hydroxide in nitric acid and containing 0.4 pound of dissolved zirconium per gallon of solution therein and 22 percent by weight of free acid was subjected to treatment according to this example.

The evaporator used comprised a cylindrical tank which was 6½ feet in diameter provided with a conically shaped bottom, the depth of the bottom being 5 feet, the tank having side walls extending 13 feet above the top edge of the cone bottom. The zirconyl nitrate solution was added to the tank until the tank was about half full. Heating of this solution was effected by withdrawing solution continuously from the tank through a pipe at the rate of about 1100 gallons a minute and at a pressure of 25 pounds per square inch, and passing the withdrawn solution into a heating chamber which was heated by steam tubes through which was circulated steam at 235 pounds per square inch gauge pressure. The thus heated solution was then returned to the upper portion of the tank at a point above the liquid level thereof.

In the course of the heating, vapors of nitric acid and water were driven off and condensed. More zirconium nitrate solution was fed to the tank at the rate of about 5 gallons per minute and a slurry containing in excess of 20 percent by volume of precipitated solids was thus produced. The concentration of these solids was measured by placing a sample of the slurry in a 15-milliliter tube and rotating the tube in a centrifuge at 1800 r.p.m. for 2 minutes, the tube being located about 5 inches from the center of rotation.

Heating of the slurry was continued with continued feed of solution at the rate of 5 gallons per minute into the tank for about 26 hours. Thereafter, slurry was withdrawn continually from the bottom of the evaporating tank at a rate of about 3 gallons per minute, feed solution being fed to the tank at a rate of about 6 gallons per minute. The slurry which was withdrawn from the bottom of the tank was then filtered and a pasty filter cake was obtained. The average time of retention of the precipitated solids in the tank was 24 to 26 hours. The exact composition of this filter cake is uncertain and appears to vary from time to time. At all times, it contains both zirconium and nitrate. Sometimes the paste is largely soluble in water. Other times it is not. The reason for this variation is not understood.

The resulting filter cake was fed to the entry end of a horizontal rotating kiln having an internal diameter of 4 feet and a length of 30 feet. The kiln was rotated at the rate of 4 rotations per minute. During this operation, the temperature of the portion of the kiln adjacent the feed end was about 1100 to 1300° F. The temperature in the middle section of the kiln ranged from 1200 to 1400° F. and the temperature adjacent the exit end of the kiln was approximately 1500° F. These temperatures were measured by means of sensing devices in the walls of the kiln. The paste was fed to the kiln substantially at the rate of 15 pounds per minute, together with about three-tenths of a gallon per minute of filtrate obtained from the filtration.

The resulting zirconium oxide had a density of about 90 to 100 pounds per cubic foot.

The chlorination of this material is conducted as follows:

Pellets are made up as follows: the zirconium oxide referred to above, carbon black, and water are mixed together in the proportion of 400 pounds of zirconium oxide, 70 pounds of carbon black, 136 pounds of water, and 135 pounds of an aqueous sugar solution containing 67 percent by weight of water. This mixture forms a paste which is extruded into rods approximately one inch in diameter. These rods are introduced into a rotary kiln and are calcined at a temperature gradually rising to 800 to 1100° F. Thereafter, the calcined agglomerates obtained from the kiln are crushed and sized to obtain pellets which are retained on 50 mesh screen but passed through 20 mesh screen.

The following is a typical screen size analysis, the amounts opposite the screen size indicated being the amounts which do not pass through that screen:

Screen size (mesh): Percent by Weight of product left on screen
- 16 _____ 0.20
- 20 _____ 29.3
- 40 _____ 42.0
- 60 _____ 18.7
- 80 _____ 7.3
- 100 _____ 1.0
- Through 100 mesh _____ 1.9
- Loss _____ 0.1

The pellets thus obtained have a bulk density of 65 to 70 pounds per cubic foot and contain about 81.56 percent by weight of $ZrO_2$, 18.3 percent by weight of carbon, and 0.41 percent by weight of water.

The furnace used is a brick shaft furnace having an internal diameter of 4 feet 4 inches and generally described and illustrated in a copending application filed by Gordon A. Carlson, Serial No. 798,768, filed March 11, 1959, now abandoned. This furnace is provided with a liner of carbon brick in the lower portion which constitutes the reaction zone. Thus, the actual chlorination zone has an internal diameter of 2 feet 10 inches, the vapor space above this zone being larger in diameter.

The furnace is heated to about 1300° F., a quantity of the granules is introduced, and chlorine is introduced into the furnace at a rate of 338 pounds per hour. Enough granules are added to produce a static bed 3 feet deep. The bed is fluidized by introducing oxygen along with the chlorine at a rate of 134 cubic feet per hour, measured at 760 millimeters of pressure and 70° F. Reaction is initiated and zirconium tetrachloride is formed and vaporized. $ZrO_2$ pellets prepared as described above are fed into the furnace at the rate of 350 pounds per hour.

The process is conducted over a period of several days during which the temperature of the bed remains at about 1000 to 1200° F. (measured in a thermo-couple in the furnace wall at a point close to the reaction zone). The temperature of the vapor above the reaction zone remains at about 1000° F. and the temperature at the outlet of the furnace, which is 14 feet above the level of the bed, is about 620° F.

Approximately 7 percent by weight of the zirconium oxide and carbon fed to the bed is conveyed out of the reactor by the vapors formed. These vapors, containing suspended solids, are passed through a cyclone separator having an internal diameter of 4½ inches and an outlet for the vapors 19 inches above the inlet thereof. The suspended solids are thus separated from the vapors without condensation of zirconium tetrachloride. Condensation of zirconium tetrachloride in the cyclone is prevented by maintaining the temperature of the cyclone at about 650° F.

The average $ZrO_2$ and carbon content of the feed, the bed, and the product in the cyclone during the operation is as follows:

Feed (percent by weight):

- $ZrO_2$ _____ 81.56
- Carbon _____ 18.30
- $H_2O$ _____ 0.41

Bed (percent by weight):

- $ZrO_2$ _____ 71.49
- Carbon _____ 25.11

Cyclone (percent by weight):

- $ZrO_2$ _____ 78.84
- Carbon _____ 20.82

The zirconium tetrachloride is condensed in two condensers arranged in series following the cyclone separator. The typical composition of the product obtained from these condensers is as follows:

|  | First Condenser | Second Condenser |
| --- | --- | --- |
| $ZrCl_4$ (Percent by weight) | 98.43 | 97.95 |
| $ZrO_2$ (Percent by weight) | 0.78 | 0.89 |
| $ZrOCl_2$ (Percent by weight) | 0.73 | 0.55 |
| Carbon (Percent by weight) | 0.29 | 0.62 |

The process may be conducted resorting to numerous variations of that illustrated in the above example. For example, the solids content of the slurry which is withdrawn from the evaporator may vary between about 15 to 70 percent by volume, using the method of measurement described above. In the above example, the evaporation was conducted by heating the solution under a pressure of 2.0 to 2.5 pounds per square inch gauge. This is not necessary since heating in vacuum at the boiling point of the solution can be performed effectively.

In the example described above, the temperature of the slurry being heated remained at about 242 to 250° F., which was the temperature at which evaporation of water and more or less nitric acid from the pool took place. Heating may be conducted at any other convenient temperature which concentrates the solution, for example, 125° F. or above.

Heating for 40 to 60 hours according to the above example produced a thixotropic, slow filtering product which when calcined produced zirconium oxide having a bulk density as high as 140 pounds per cubic foot. This heating can be conducted even when not accompanied by evaporation of vapors from the zirconium solution or when the vapors are condensed and refluxed.

The time of heating required to produce the paste or thixotropic product is dependent upon the temperature, shorter periods of time being required at higher temperatures than at lower temperatures. When the temperature of the slurry is equal to or below that at which water is evaporated therefrom at atmospheric pressure, the time of heating the zirconium nitrate slurry should be at least about 10 to 24 hours and, at temperatures of 125 to 250° F., even longer times may be required. The formation of the thixotropic or pasty product is accelerated by heating at superatmospheric pressures above the boiling temperature of the solution, for example, 350 to 600° F.

In a continuous process, the same conditions apply and the average retention time of the zirconium in the pool may be computed by dividing the average number of pounds of zirconium in the pool over a particular period undergoing heating by the average number of pounds of zirconium withdrawn from the pool per minute during the same period. This gives the retention time in minutes.

The solids content of the slurry heated normally ranges from 3 to 20 percent by weight of the slurry. In order to achieve fluidity of the slurry, however, less water may be present where transfer of the slurry is unnecessary. Thus, nitrates of zirconium-water mixtures containing as great as 60 percent by weight of solids may be subjected to treatment.

Calcination of the nitrates of zirconium is continued until the product is preponderantly $ZrO_2$ and in most cases until the $NO_3$ content of the product falls below 0.5 to 1.0 percent by weight.

The above described process also is useful for production of hafnium oxide and basic nitrates of hafnium having the composition $HfO_x \cdot (NO_3)$, where $x$ is 2 or below 2, rarely less than 0.1 to 0.2, and to production of mixtures of hafnium oxide with zirconium oxide or basic nitrates of hafnium with basic nitrates of zirconium. Thus, the process of the above example may be performed to produce these materials simply by using basic nitrates of hafnium in lieu of basic nitrates of zirconium.

Although the present invention has been described with reference to the specific details of certain embodiments, it is not intended that such details shall be regarded as limitations upon the scope of the invention except insofar as included in the accompanying claims.

What is claimed is:

1. A method of preparing an oxide of a metal of the group consisting of zirconium and hafnium having a bulk density of at least 40 pounds per cubic foot which comprises heating a slurry of a solid nitrate of said group for a period of at least 10 hours and at a temperature of at least 125° F., maintaining enough water in the slurry to hold the resulting solids in slurry form during the heating, separating water from the slurry and thereby forming a thixotropic mixture of water and said nitrate, and calcining said mixture to remove nitrogen oxides therefrom and thereby to form said oxide.

2. The process of claim 1 wherein the solid nitrate is produced by concentrating an aqueous solution of zirconyl nitrate and thereby precipitating a basic nitrate of zirconium from said solution.

3. A method of preparing zirconium oxide having a bulk density of at least 40 pounds per cubic foot which comprises heating an aqueous slurry of nitrate of zirconium for a period of at least 10 hours and at a temperature of at least 125° F., maintaining enough water in the slurry to hold the resulting solids in slurry form during the heating, separating water from the slurry and thereby forming a thixotropic mixture of water and nitrate of zirconium, and calcining the mixture to remove nitrogen oxide therefrom to thereby form zirconium oxide.

4. The method of claim 3 wherein the slurry of nitrate of zirconium is solid nitrate of zirconium suspended in aqueous nitric acid.

5. The method of claim 3 wherein the solids content of the slurry is maintained at 3 to 60 percent by weight.

6. A method of preparing a nitrate of zirconium capable of producing zirconium oxide having a bulk density of at least 40 pounds per cubic foot when calcined at a temperature of 550° F. to 1500° F. which comprises heating an aqueous slurry of solid nitrate of zirconium at a temperature of at least 125° F. for a period of at least 10 hours while maintaining a solids content of the slurry at 3 to 60 percent by weight, separating water therefrom and forming a thixotropic mixture of water and a nitrate of zirconium.

7. The method of claim 6 wherein the slurry of nitrate of zirconium is solid nitrate of zirconium suspended in aqueous nitric acid.

8. A method of preparing nitrate of zirconium capable of producing zirconium oxide having a bulk density of at least 40 pounds per cubic foot when calcined at a temperature of 550° F. to 1500° F. which comprises forming an aqueous pool of zirconyl nitrate having a temperature of at least 125° F., concentrating the solution to precipitate a solid nitrate of zirconium, heating the resultant slurry to vaporize water, feeding further aqueous solution of zirconyl nitrate into the pool while continuing the heating to maintain a solids content of the slurry at 3 to 60 percent by weight, withdrawing the slurry thus produced from said pool and correlating the rate of addition of said solution and withdrawal of said slurry so that the average retention time of nitrate of zirconium in said pool is at least 10 hours, and separating the nitrate from the slurry.

9. The method of claim 8 wherein the solids content of the slurry is maintained at 3 to 20 percent by weight.

10. A method of preparing zirconium oxide having a bulk density of at least 40 pounds per cubic foot which comprises heating a slurry of basic zirconium nitrate which has a formula $ZrO(NO_3)_x$, where $x$ is less than 2 at a temperature of at least 125° F. for at least 10 hours while maintaining the solids content of said slurry at 3 to 60 percent by weight, separating water from at least a portion of said slurry to provide a thixotropic mixture of nitrate of zirconium and water and calcining the resulting mixture to remove nitrogen oxide therefrom and produce zirconium oxide.

References Cited by the Examiner

Blumenthal, The Chemical Behavior of Zirconium, D. Van Nostrand Company, Inc., 1958, pages 283 to 288.

Chouvenet et al., Compt. rend., 166, 781–3, 821–4 (1918).

Mellor, Comprehensive Treatise on Inorganic and Theoretical Chemistry, Longmans, Green & Co., New York, 1927, vol. VII, pages 124, 161 and 162.

Pied et al., Compt. rend., 198, 1505–6 (1934).

Rosenheim et al., Ber., 40, 803 to 810 (1907).

MAURICE A. BRINDISI, *Primary Examiner.*